Dec. 27, 1955     F. R. FOWLER     2,728,233
GYROSCOPE
Filed Nov. 20, 1948     2 Sheets-Sheet 1
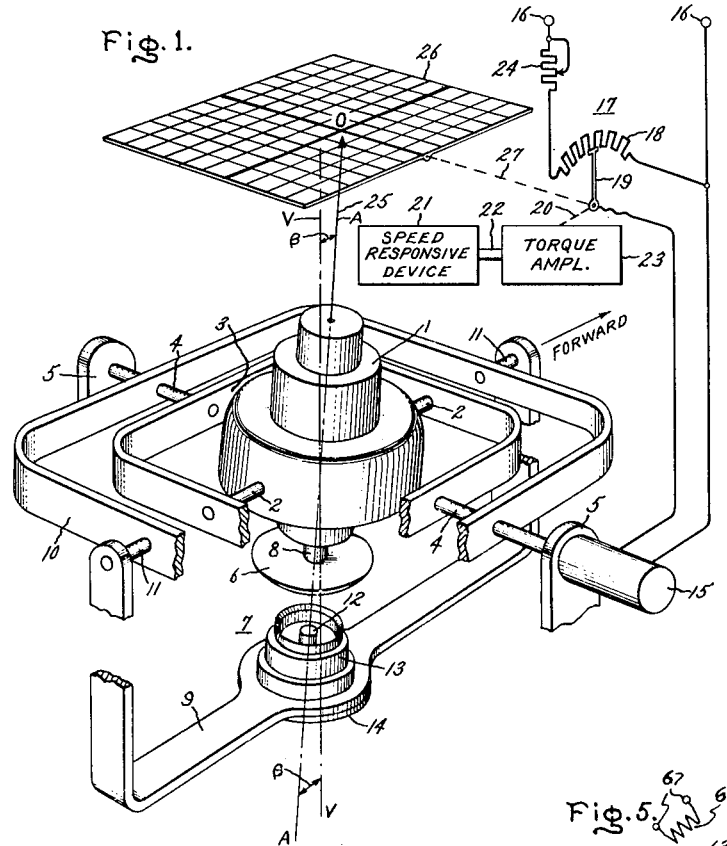
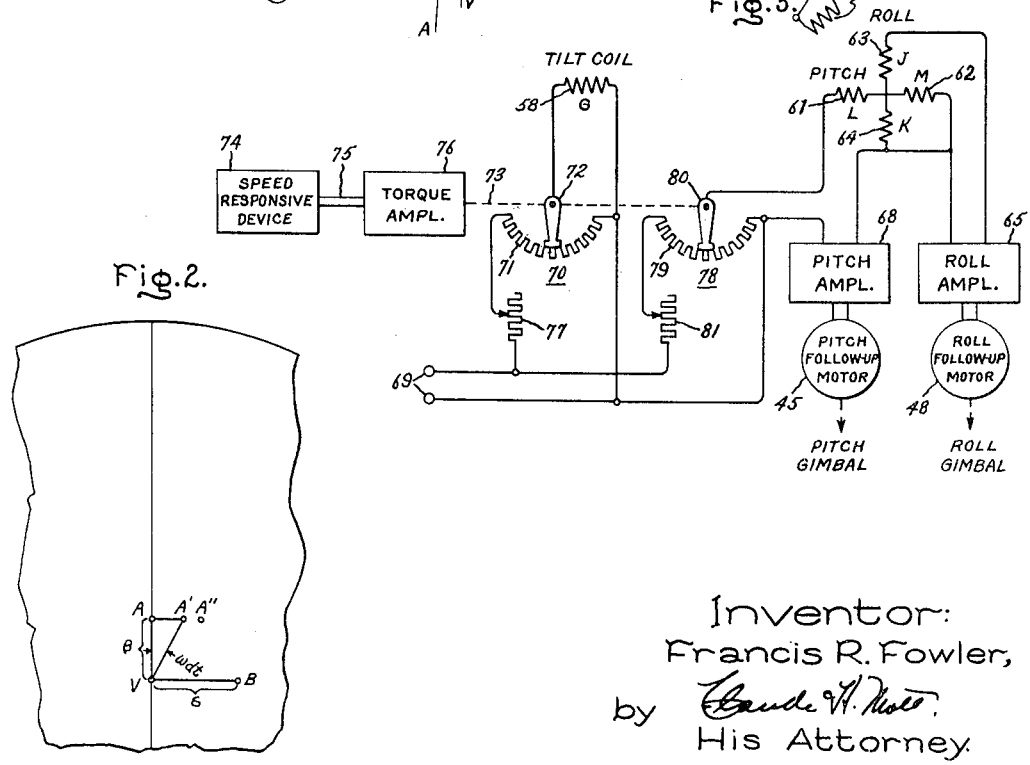
Inventor:
Francis R. Fowler,
by Claude N. Mott
His Attorney.

Dec. 27, 1955  F. R. FOWLER  2,728,233
GYROSCOPE

Filed Nov. 20, 1948  2 Sheets-Sheet 2

Inventor:
Francis R. Fowler,
by [signature]
His Attorney.

United States Patent Office 2,728,233
Patented Dec. 27, 1955

2,728,233

GYROSCOPE

Francis R. Fowler, Ballston Lake, N. Y., assignor to General Electric Company, a corporation of New York Application November 20, 1948, Serial No. 61,147

7 Claims. (Cl. 74—5.41)

The present invention relates to gyroscopes, and more particularly to improved means for eliminating errors due to turns and changes in speed in gyro verticals adapted to be mounted on ships and other moving vehicles.

Gyroscopes commonly referred to as gyro verticals are widely used to provide a reference of the vertical direction or horizontal plane for indication, or control purposes, or both. Because the spin axis of a gyroscope tends to wander slowly due to bearing friction, rotation of the earth, etc., it is necessary to provide an erection system for urging the spin axis of the gyroscope toward the true vertical position. The erection system usually comprises a pendulum positioned by gravity, and means controlled by the position of the pendulum relative to the gyro for slowly precessing the gyro into the vertical reference position indicated by the pendulum. Due to the long period of the gyro, short period oscillations of the pendulum, due to rapid accelerations do not cause appreciable error since the mean position of the pendulum indicates the true vertical. Other rapid accelerations however, such as those caused by turns and changes of forward speed, endure for long enough periods of time as to cause an appreciable displacement of the gyro spin axis from the reference position thus giving rise to a considerable error.

Heretofore, it has been necessary to avoid these errors by the expedient of completely disengaging the erection system during turns or changes in speed. Under battle conditions, ships maneuver violently and almost continuously to avoid enemy aircraft attacks, and therefore the erecting system may be disengaged for long periods of time, during which the cumulative effect of minute imperfections in the gyroscope can cause it to wander far from the vertical.

In Patent No. 2,510,968 I disclosed a system for compensating a gyroscope for errors arising from turns, which comprises, arranging the erecting pendulum so that the gyro spin axis is somewhat tilted at a constant angle in the direction of vehicle motion. This system, however, does not provide compensation for the error caused by changes in forward speed.

It is an object of the present invention to provide a simple and improved means for compensating for those errors in gyro verticals which arise due to turns and changes of speed of the vehicle.

Another object of my invention is to provide in a gyro, a reference of the vertical position which will serve as a true vertical reference irrespective of acceleration forces.

A further object of my invention is to provide novel means for varying the forward tilt of a gyro vertical in accordance with vehicle speed.

Still another object of my invention is to provide novel means for applying a precessing force to a gyro vertical which will tilt the top of the gyro axis in a forward direction as a function of vehicle speed.

Briefly, according to the present invention, means are provided for tilting the gyro spin axis in the direction of vehicle motion as a function of speed, and in contradistinction to my above copending application, I maintain the excitation of the erecting magnet constant. Biasing means compensate for the spin axis tilt whereby a true vertical reference is provided at all times irrespective of the angle of tilt.

My invention will be more fully understood by referring now to the accompanying drawings wherein:

Fig. 1 shows a simple, diagrammatic representation of a gyro vertical designed to illustrate the principle of my invention.

Fig. 2 is a diagram for explaining the theory of operation of the invention.

Fig. 5 is a schematic, circuit diagram pertaining to Figs. 3 and 4.

Figure 3:
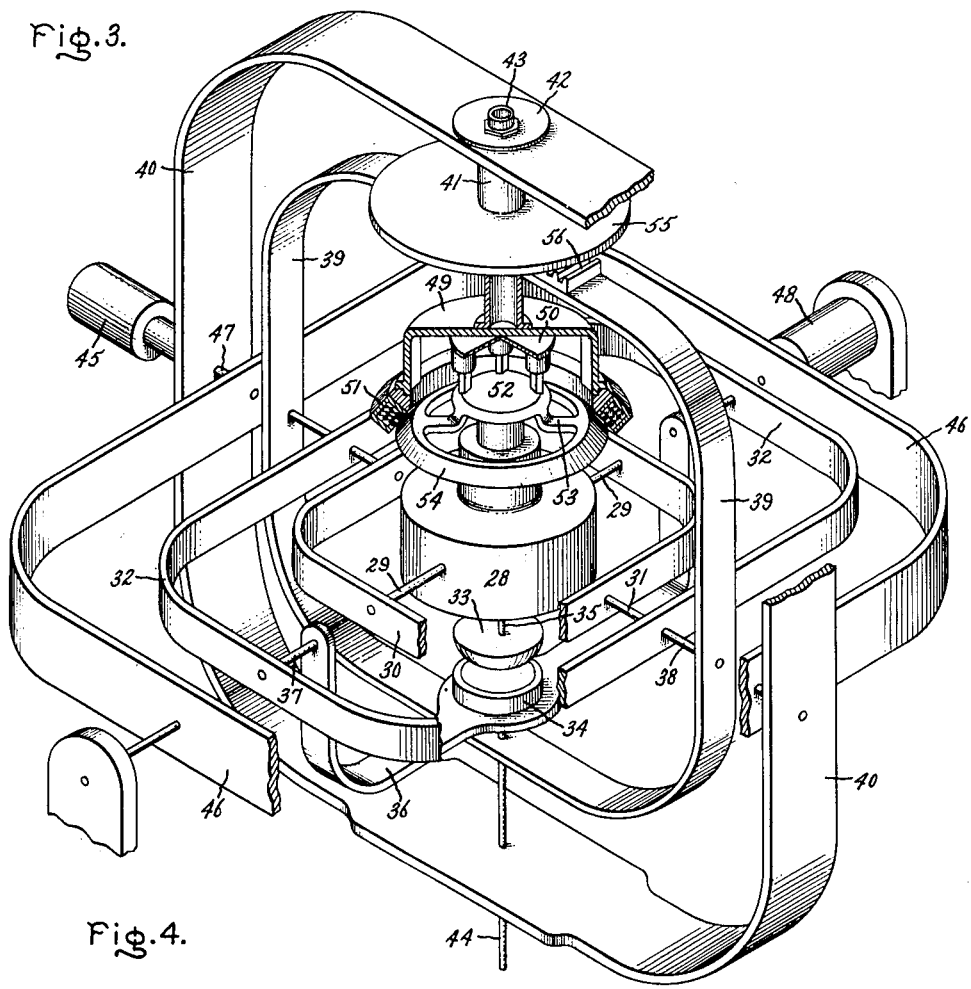
Fig. 3 is a perspective, partly-sectional view of a gyro vertical showing a specific embodiment of my invention.

Referring to Fig. 1 of the drawing, I have shown a gyro vertical which is suitable for mounting on a moving vehicle such as a ship. As used on aircraft however, such a gyroscope may be used to indicate the pitch and bank attitude.

As shown, the gyroscope comprises a rotor bearing casing 1 which houses a gyroscope rotor (not shown) having a spin axis extending in the direction of the dash line A—A. The gyro bearing casing 1 is pivoted for movement about a horizontal axis by means of trunnions 2 which are fixed in a gyro gimbal 3. The gimbal 3 is in turn pivoted for movement about a horizontal axis perpendicular to the axis of trunnions 2, the gimbal 3 being pivotally mounted on the trunnions 4 which are themselves pivotally mounted in fixed supports 5. In other words, gimbal 3 is rotatable with respect to trunnions 4, and trunnions 4 are in turn rotatable with respect to supports 5. The supports 5 are arranged on the ship in such a way that the axis of the trunnions 4 extends athwartship, and the axis of trunnions 2 extends in the direction of the fore and aft axis of the ship.

In order to provide means for erecting the gyroscope so that the spin axis A—A may be urged toward the vertical position, there is provided an eddy current erection system comprising a rotating eddy current disk 6 and a cooperating magnet 7. The disk 6 is mounted on a rotating shaft 8 which may be, as shown, an extension of the gyro rotor shaft.

The magnet 7, which cooperates with the eddy current disk 6, is pendulously mounted beneath the disk so that it is free to swing in any direction under the influence of gravity and acceleration forces acting thereon. To this end, the magnet is centrally mounted on a support or bail 9 which is pivotally mounted on a horizontal outer gimbal 10 by means of trunnions 11. The gimbal 10 is in turn pivotally supported on the trunnions 4. However, unlike gimbal 3 which is pivotally mounted on trunnions 4, gimbal 10 is firmly affixed by any suitable means to trunnions 4 so that any movement of trunnions 4 causes a movement of gimbal 10 or vice versa. The axis of trunnions 4 and 11 are perpendicular so that universal movement of the magnet 7 is permitted. The bail 9 and gimbal 10 are so balanced that the center of the magnet 7 lies in the true vertical V—V when under the influence of gravity alone.

The magnet 7 comprises a center cylindrical pole piece 12 and an outer annular pole piece 13 which are mounted in concentric relationship on a base member 14 which is preferably formed of magnetic material so as to provide a return path for magnetic flux flowing between the poles 12 and 13. The magnet extends through a central opening in the bail 9, the base member 14 having a retaining flange which is secured to the bail by means of screws (not shown).

If desired, the magnet 7 may be provided with an energizing coil around the center pole piece 12 in the space between the inner pole piece 12 and the outer annular pole piece 13. Were such a coil to be utilized, it will be clear that a magnetic flux would flow between the pole pieces 12 and 13 and would pass through the eddy current disk 6 and be substantially symmetrical about the axis of the pole piece 12.

The magnet 7 is shown as not energized merely to emphasize that my invention calls for a predetermined constant magnetic coupling in the erecting system. It will be appreciated of course that in practice electromagnetic means may be provided to accurately adjust the degree of magnetic excitation to the required amount at which value it will thereafter remain.

The eddy current disk 6 is arranged to lie in close proximity to the pole pieces of magnet 7, and is preferably formed of magnetic material so as to provide a low reluctance path for the magnetic flux flowing between the poles of magnet 7. When the gyroscope is in operation, the eddy current disk 6 rotates and the magnetic flux produced by the magnet 7 causes eddy currents to be induced in the disk 6, as will be well understood by those skilled in the art. When the eddy current disk 6 and magnet 7 are in a neutral position in which the axis of the shaft 8 and the pole piece 12 are in alignment, the eddy currents produced in the eddy current disk 6 are in a state of balance about the axis of shaft 8, and there is no drag torque tending to precess the gyroscope. If, however, relative displacement occurs between the eddy current disk 6 and magnet 7, the induced eddy currents are asymmetrical with reference to the axis of shaft 8, and as a result there is a net eddy current drag torque which precesses the gyro in a direction urging the eddy current disk 6 to the neutral position. Thus, due to the eddy current erecting action, the gyroscope is continuously precessed toward a position determined by the position of the pendulous magnet 7.

It is desirable to have the precessing torque exerted on the gyroscope vary approximately as the tangent of the relative angular displacement of the gyro from the pendulous magnet 7. This can be accomplished in a number of ways as will be understood by those skilled in the art.

According to the present invention, compensation for errors due to turns and varying rates of speed of the ship is obtained by tilting the top of the gyro in the direction of movement of the ship and in direct proportion to the forward speed of the ship. This may be accomplished as shown in Fig. 1 by means of a torque motor 15 which is rigidly mounted to the fixed support 5 and adapted to apply a torque to the gimbal 10 through the one trunnion 4 whereby the magnet 7 is displaced from the vertical V—V by an angle $\beta$ which will depend on the magnitude of the torque applied by the torque motor 15. Through the aforesaid eddy current erecting effect this displacement of magnet 7 causes a similar displacement, i. e. precession, of the independently pivoted gyro casing 1, whereby the gyro spin axis is also tilted forward through the angle $\beta$. When the ship is stationary and the gyroscope is erected the gyro spin axis assumes the position indicated by the dash line V—V which is truly vertical. As the ship moves forward, the orientation of the spin axis will become such that a plane containing the vertical line V—V and the new spin axis A—A will lie in the direction of movement of the ship on which the gyro is mounted and the top of the gyroscope will lean in the forward direction.

The torque motor 15 is connected to a suitable source of direct or alternating current supply 16 through a potentiometer 17 comprising a resistance element 18 and a wiper arm 19. The wiper arm 19 is mounted on a rotatable shaft 20 which is positioned in accordance with the output of a device responsive to the speed of the ship. Such a speed responsive device is illustrated schematically by the numeral 21, and is shown as having an output shaft 22 which is angularly displaced in accordance with the speed of the ship. In order to obtain a high degree of accuracy and to avoid undue loading of the speed responsive device 21, the shaft 20 and the output shaft 22 of the speed responsive device are coupled through a torque amplifier 23. The details of the speed responsive device 21 and the torque amplifier 23 are not shown since these devices are well known and form no part of the present invention.

The coupling between the speed responsive device 21 and the potentiometer arm 19 is such that when the speed of the ship increases, the potentiometer arm 19 is rotated in a counterclockwise direction to increase the exciting current to the torque motor 15. When the speed of the ship decreases, the arm 19 rotates in a clockwise direction to decrease the exciting current to the torque motor 15. By properly tapering the resistance element 18 of the potentiometer 17 in connection with the angular output of the speed responsive device 21, it will be clear that an appropriate exciting current can be supplied to the torque motor 15. A trimming rheostat 24 is provided for calibration purposes.

In the simplified embodiment illustrating the principle of my invention, I have not shown an elaborate indicating system since any suitable means may be employed such as a simplified scale and pointer arrangement which indicates roll and pitch attitude for example, it being my primary purpose to illustrate instead, how compensation must be introduced in the indicating system to offset the necessarily varying deviation of the gyro spin axis from the vertical position with changes in ship's speed. To this end, I provide a pointer 25 which is schematically shown as fixed to the top of the gyro casing coaxially with the spin axis of the rotor. A coordinate scale 26 is cooperatively disposed with respect to the pointer 25 and may be suitably calibrated to indicate the deviation of the gyro spin axis from its erected position which it would assume in the absence of pitch and roll. The coordinate scale 26 is connected to potentiometer arm 19 by means schematically identified as 27. At zero speed the potentiometer arm 19 will assume a fixed position, and this position will change with increases of speed so that it will be seen that the coordinate scale 26 will also move in direct proportion to the speed of the vehicle.

In operation, when the gyro is fully erect and the ship is not under way, any roll and pitch will result in corresponding movement of the fixed supports 5 and of all other apparatus fixed to the ship such as the potentiometer arm 19 and the scale 26, and since the gyro is universally mounted, there will be relative movement between the pointer 25 and the scale 26 to indicate the degree of pitch and roll.

Let us assume that there is no roll and pitch, and that the pointer 25 is centered on the scale 26 at zero speed of the ship. As the ship moves forward with increasing speed, the gyro, and thus the pointer 25 will also be tilted forward. Having assumed the simple condition of zero roll and pitch, it must follow that the scale 26 must of necessity be moved forward a corresponding amount so that its center will remain in alignment with the pointer 25 in order to correctly indicate the true condition of zero roll and pitch. The need for a bias arrangement will therefore become immediately apparent and, as shown schematically, this is accomplished by moving the scale 26 in direct proportion to the ship's speed by means of connections 27 and 20.

If the forward angle of tilt of the gyroscope is made to be directly proportional to the forward speed of the ship upon which it is carried, etc. then it can be shown that all errors due to turns and changes in speed can be eliminated and the indicating system may be biased so as to indicate the gyro spin axis position which would exist were it not for the intentional axis tilting due to ship's speed. Otherwise stated, a stable element adapted to provide a true vertical reference, will in fact indicate the true vertical irrespective of turns or changes of speed that may occur, if the gyro is properly tilted in the direction of movement in proportion to the speed of the vehicle, and provided the indicating system is compensated to counteract for the amount of tilting. The proof of this follows from the following mathematical consideration taken in connection with the explanatory diagram shown in Fig. 2 of the drawing.

When the ship makes a turn, it is subjected to a centrifugal acceleration, $\omega v$ where $\omega$ is the rate of turn of the ship and $v$ is its linear velocity. This acceleration causes the apparent vertical to be displaced toward the outside of the turn by an angle (1)
$$\delta = \tan^{-1} \frac{\omega v}{g}$$

where $g$ is the acceleration of gravity.

As a result of this displacement, the erection system causes the gyroscope to precess in a direction perpendicular to the direction of motion of the ship at a rate $\phi$, which is a function of the angle $\delta$.

The geometrical figure shown in Fig. 2 of the drawing represents a fragmentary portion of the top surface of a unit sphere having its center at the center of the gimbal system of the gyroscope. V is the projection of the true vertical, and A is the projection of the gyroscope spin axis on the surface of the sphere. VA, which is the projection of the angle $\beta$, is also the direction of motion of the ship, and VB is the projection of the apparent vertical.

If the ship is turning at a rate $\omega$, VA' is the direction of motion of the ship at an increment of time, $dt$, later, when it has turned through an angle $\omega dt$. In the same increment of time, the gyroscope has precessed through the angle (2)
$$AA'' = \phi dt$$

because of the action of the erection system. The angle AA' equals $\beta \omega dt$, provided that $\beta$ and $dt$ are small. Therefore, if $\phi = \beta \omega$, $AA'' = AA'$, and the gyroscope will still indicate the true vertical after the ship has been turning for a time $dt$. Since the same analysis can be made for any particular increment of time during the turn, there will be no error in the gyroscope indication no matter how long the ship continues to turn, provided that the condition $\phi = \beta \omega$ is satisfied.

If the erection system is designed to cause a precession rate which is proportional to the tangent of the displacement angle between the gyroscope and the erecting system, then we can write.

(3)
$$\phi = K \tan \delta = \frac{K \omega v}{g}$$

where K is the coupling coefficient which is maintained constant. Therefore by making (4)
$$\beta = \frac{Kv}{g}$$

the condition that $\phi = \beta \omega$ is satisfied, and there will be no turning error regardless of the magnitude of the rate of turn.

When a change of speed occurs, the bias angle $\beta$ will of course change. Its rate of change $$\frac{d\beta}{dt}$$

will be equal to $$\frac{K}{g} \frac{dv}{dt}$$

since K is a constant. This means that in order for the indicating system to continue to indicate the true vertical the gyroscope must be precessed in the fore and aft direction at a rate $$\alpha = \frac{K}{g} \frac{dv}{dt}$$

However, the change of speed is the result of a fore and aft acceleration $$\frac{dv}{dt}$$

which causes a displacement of the apparent vertical $$\delta = \tan^{-1} \frac{1}{g} \frac{dv}{dt}$$

which will also be the displacement between the erecting system and the gyroscope. The precession rate of the gyroscope is then $$\alpha = K \tan \delta = \frac{K}{g} \frac{dv}{dt}$$

thus satisfying the condition for the indicating system to maintain the true vertical. Therefore by adjusting $\beta$ so that (5)
$$\beta = K \frac{v}{g}$$

there will be no turning error regardless of the rate of turn or change of speed of the ship.

It will be apparent from an inspection of Equation 5, that in order to satisfy the requirement for turn and speed error compensation, $\beta$ must be varied in direct proportion to the ship's speed $v$, since the factors K and $g$ remain constant. In the embodiment of the invention illustrated in Fig. 1, this is accomplished by varying the exciting current to the torque motor 15, in direct proportion to vehicle speed. Having explained the principle of my invention, I will now describe an actual embodiment, as illustrated by Fig. 3, in which this principle is utilized in a novel manner.

Fig. 3 discloses a gyro vertical of the type wherein it is desired to provide a vertical reference means known in the art as a stable element. It will be recognized as the type wherein the roll and pitch axes are stabilized in the conventional manner, and wherein the inner gimbal system is continuously rotated within the roll and pitch axis so as to eliminate stray unbalanced torques.

The gyroscope comprises a rotor bearing casing 28 which houses a gyroscope rotor (not shown). The gyro bearing casing is pivoted for movement about a horizontal axis by means of trunnions 29 which are fixed in a gyro gimbal 30. The gimbal 30 is in turn pivoted for movement about a horizontal axis perpendicular to the axis of trunnions 29 by means of trunnions 31 which pass through a magnet gimbal 32.

In order to erect the gyroscope, there is provided an eddy current erection system comprising a rotating eddy current disk 33 and a cooperating magnet 34. The eddy current disk 33 is mounted on a rotating shaft 35 which may be an extension of the gyro rotor shaft itself.

Magnet 34 which cooperates with the eddy current disk 33, is pendulously mounted beneath the disk so that it is free to swing in any direction under the influence of gravity and acceleration forces acting thereon. To this end, the magnet 34 is centrally mounted on a bail 36 which is pivotally mounted on magnet gimbal 32 by means of trunnions 37. Connected through gimbal 32 are trunnions 38 which are coaxial with trunnions 31, and which extend, and are fixed, to a rotating gimbal 39.

Gimbal 39 is supported from pitch gimbal 40 and is adapted to rotate about a vertical axis. The support, for example, may comprise a collared shaft 41 fixedly mounted to the pitch gimbal 40 by means of a washer 42 and lock nut 43. Gimbal 39 may be supported by a suitable bearing on a shoulder (not shown) of the shaft 41 and rotated in any suitable manner, for example, by means of a shaft 44 journaled through the lower extremity of pitch gimbal 40 and is adapted to be driven by a suitable motor. Thus, it will be seen that the entire gyroscope gimbal system together with the erecting system is carried in a rotating gimbal 39, which may be rotated continuously at some constant speed, for example, 6 R. P. M. The purpose of this rotating feature is to decrease the effect of any unbalance of the gyroscope system and the erecting system by averaging out the effects of small, unbalanced stray torques.

The pitch gimbal 40 is power driven by motor 45, and carried on the roll gimbal 46 by means of trunnions 47. The roll gimbal 46 is power driven by a motor 48 whose housing is fixedly supported on the ship's deck. Likewise, the opposite end of the roll gimbal 46 is pivotally supported by a trunnion mounted in a support firmly affixed to the deck. The pitch gimbal 40 may be considered as the reference which it is desired to stabilize, and it may at all times serve to indicate the true vertical.

Attached to the lower end of shaft 41 is a coil assembly support 49 which is rigidly fixed with respect to shaft 41, and therefore with respect to pitch gimbal 40. The support 49 provides a framework for carrying two groups of electromagnetic coil assemblies. An inner assembly 50 is made up of pick-up coils which are utilized in a well known manner to furnish an error signal to a servo system for driving pitch and roll follow-up motors 45 and 48. Since the particular means for stabilizing the roll and pitch gimbals of a gyroscope is not a part of this invention, and is well known, it will only be necessary to point out here that conventional means are provided whereby the pitch gimbal 40 is stabilized to provide a vertical reference at all times after the gyro has become erected. Surrounding the group of pick-up coils 50, are seven other coils comprising the second assembly. The second assembly of coils is mounted in an annular ring of magnetic material 51 which is rigidly supported to the framework 49.

Mounted on top of the gyro casing 28 are two circular armatures 52 and 54. These armatures are of course stationary with respect to the gyro casing 28, and are symmetrically mounted so as to be concentric with the spin axis of the gyro rotor. The two armatures are interconnected by insulating members 53 and are disposed in cooperative relation with the poles of the two coil assemblies. The armature 54 may simply be an annular ring of magnetic material such as iron, which is so positioned as to be subject to magnetic attraction by one of the coils of said second assembly as will be hereinafter more fully explained. The gyro casing together with its two armatures enjoys universal freedom of movement without restriction or interference from the coil assemblies.

It will be noted that the shaft 41 is hollow and may conveniently serve as an exit for the leads from the coil assemblies. However, since shaft 41 is stationary and the coils are rotating with coil support 49, a slip ring assembly 55 is necessarily mounted on shaft 41 to cooperate with a brush assembly 56 mounted on gimbal 39, the coils being wired directly to the brush assembly.

Figure 4:
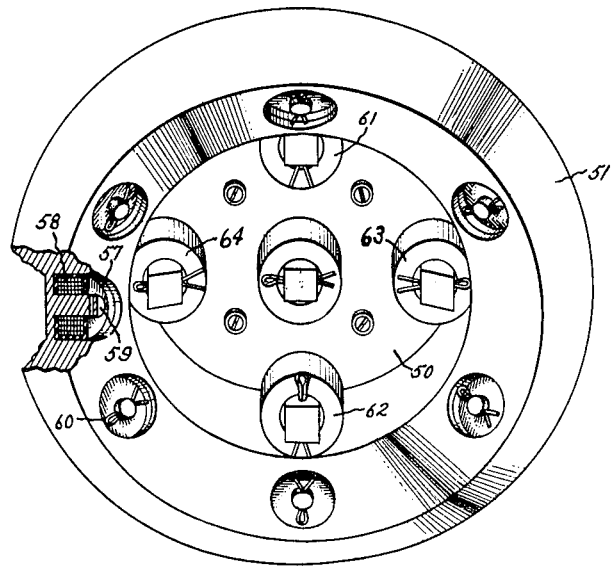
Fig. 4 is a perspective, partly-sectional view of a coil assembly used in the gyro of Fig. 3, the details of which are not fully apparent from Fig. 3.

Referring now to Fig. 4 of the drawing, it will be more clearly shown that the annular magnetic ring 51 contains seven cylindrical recesses. However, six of these are equidistantly spaced and symmetrically disposed and contain coils which are used for latitude correction purposes as more fully explained in the copending application of Ramond J. Johnson entitled, "Latitude Correction for Gyroscope," filed November 13, 1948, Serial No. 59,832 which is assigned to the instant assignee. The seventh recess, identified as 57, contains a coil 58, both of these being illustrated in cross section. The coil 58 is fitted into the recess 57 over a guide-like pole 59. The coil winding 58 may be retained on the pole 59 by means of a cotter pin 60 as shown on the adjoining pole. It will be seen that the axis of coil 58 is perpendicular to the surface of the armature 54 and is adapted to be energized so as to exert a strong electromagnetic action on the armature 54. The outer radius of armature 54 should be slightly less than the shortest distance between the axis of pole 59 and the axis of rotation of the gimbal 39.

It will be observed that Fig. 4 provides a better view of the inner coil assembly 50 together with the two pitch pick-up coils 61, 62 and the roll pick-up coils 63, 64. Both the roll and the pitch pick-up coils are excited by a coil 66 which is itself energized from a voltage source 67 (Fig. 5).

Referring now to Fig. 5, I have shown schematically, the electromechanical connections necessary to effect appropriate tilting of the gyro spin axis as a function of ship's speed.

Although the follow-up system of a gyro is well known, its action can be briefly summed up as follows. When the deck moves in roll or pitch, the gyro remains stationary but the pick-up coils move. This causes voltages to be induced in the pick-up coils. These voltages are then amplified and applied to the respective follow-up motors to drive the connected loads (which in this case are the roll and pitch gimbals) back to their initial position of correspondence at which point the pick-up coils are recentered over the top of the gyro, and voltages are no longer induced in the coils. In the present instance, the position of the roll gimbal 46 is controlled by the follow-up motor 48 which receives an out of correspondence signal voltage from the roll pick-up coils 63, 64 which voltage is amplified by the roll amplifier 65. Likewise, the position of the pitch gimbal 40 is controlled by the pitch follow-up motor 45, which in the conventional system, receives a signal voltage from the pitch pick-up coils 61, 62 which is amplified by the pitch amplifier 68. However, since the spin axis of the gyro is to be tilted forward, it will be necessary to introduce a bias signal into the pitch follow-up circuit to compensate for the deviation of the gyro spin axis from the vertical position in order to provide a true vertical reference as was explained above in connection with Fig. 1. Thus, I introduce a signal which exactly compensates for that part of the pitch error signal which is due to intentional gyro tilting. The means for accomplishing precession of the gyro so that it will tilt in the direction of forward movement of the ship with changes in ship's speed, yet in a manner such that the vertical reference of the stable element is not affected, will now be described.

The tilt coil 58 is energized from a suitable source of direct or alternating current supply 69 through a potentiometer 70 comprising a resistance element 71 and a rotatable wiper arm 72. The wiper arm 72 is mounted on a rotatable shaft 73 which is positioned in accordance with the output of a suitable device responsive to ship's speed. Such a speed responsive device is illustrated schematically by the numeral 74, the device having an output shaft 75 which is angularly displaced in accordance with ship's speed. In order to obtain a high degree of accuracy and to avoid undue loading of the speed responsive device 74, the potentiometer arm 72 and the output shaft 75 of the speed responsive device are coupled through a torque amplifier 76. The details of the speed responsive device 74 and the torque amplifier are not shown since these devices are well known and form no part of the present invention. The coupling between the speed responsive device 74 and the potentiometer arm 72 is such that when the ship's speed increases, the potentiometer arm is rotated in a clockwise direction to increase the exciting current to the tilt coil 58. When the ship's speed decreases the arm 72 rotates in a counterclockwise direction to reduce the exciting current to the tilt coil 58. By properly tapering the resistance element 71 of the potentiometer 70 in connection with the angular output of the speed responsive device 74, it will be clear that the exciting current to the tilt coil 58 can be adjusted to provide any desired amount of precessing torque on the gyro by virtue of its electromagnetic pull on the armature 54. It should be observed that the magnet 34 remains pendulously supported in alignment with the V—V axis except when acted upon by accelerations and that therefore the gyro will be precessed by the torque exerted on armature 54 until the erection system torque becomes equal and opposite to that torque. Rheostat 77 is provided for calibration purposes.

As mentioned above, in order to introduce a voltage which will offset signal voltage produced by the coils 61, 62 due to intentional tilting and yet control this voltage with changes in ship's speed, I have provided a biasing means which is actuated by the speed responsive device 74. This biasing means is designed to introduce the correct signal voltage necessary in the circuit which controls the pitch follow-up motor so that the effect of intentional gyro tilting will not be transmitted to the stable element, which in this case is represented by the pitch gimbal 40. As shown, a bias voltage may be conveniently taken from the source 69. The amount of voltage which is introduced into the pitch pick-up coil circuit may be controlled by a potentiometer 78 which comprises a resistance element 79 and a rotatable wiper arm 80. Rheostat 81 is provided for calibration purposes. The wiper arm 80 is connected to the same rotatable shaft 73, which it will be remembered, is positioned in accordance with the output of the device 74 which is responsive to ship's speed. The coupling 73 is responsible for rotating the arm 80 so as to introduce from the source 69, just enough bias voltage to cause the stable element to indicate the true vertical irrespective of the degree of gyro tilt caused by the ship's speed.

It will be clear from the foregoing that I have provided a gyro vertical which will completely compensate for errors due to rates of turn and changes of vehicle speed, the compensation being accomplished automatically so that there is no need for manual adjustment. Therefore design compromises previously necessitated because of turn and speed considerations are eliminated by means of my novel gyro tilting system whereby a more accurate indication of a vertical reference on moving vehicles is obtained than has been possible heretofore.

It should be thoroughly understood that my invention, in its broader aspects, is not limited to the illustrated arrangement. Thus, for example, an alternate method of displacing the indication would be to shift the pick-up coils mechanically, relative to the output. This could be accomplished by introducing a small servo mechanism, responsive to the ship's speed input to move the pick-up coils through suitable gearing, relative to the pitch gimbal.

While I have shown and described particular embodiments of my invention, it will occur to those skilled in the art that various changes and modifications may be made without departing from my invention. Therefore, the appended claims are intended to cover all such changes and modifications as fall within the true spirit and scope of my invention.

What I claim is:

1. A gyro adapted to provide a reference of the vertical position on a moving vehicle comprising: a rotor universally mounted relative to said vehicle, means including a universally mounted pendulum and a magnet for precessing said rotor to an erected position, means for generating an electrical signal proportional to vehicle speed, means actuated by said signal for influencing a precession of said rotor proportional to vehicle speed, means for indicating the position of said rotor relative to said vehicle, and means responsive to vehicle speed for biasing said indicating means to provide compensation for said forward precession whereby a reference of the true vertical position is obtained.

2. In a gyro vertical including a rotor mounted in a casing universally suspended by gimbals from a stabilized frame, magnetic torque exerting means rigidly mounted to said stabilized frame, means for rotating said universally suspended gimbals within said stabilized frame for eliminating any unbalanced torques, an annular armature mounted on said casing and disposed to remain in the magnetic path of said torque exerting means during rotation, and means responsive to vehicle speed for controlling the strength of said torque exerting means.

3. In a device for providing a vertical reference in a moving vehicle, a gyro mounted for universal movement in a gimbal frame, magnetic means for erecting said gyro, means for tilting the spin axis of said gyro about an athwartship axis in proportion to the speed of said vehicle, means for roll stabilizing said frame with respect to said gyro, and means for pitch stabilizing said frame including, motor means for moving said frame, means for providing a signal voltage proportional to the displacement of the gyro spin axis from the true vertical, bias means responsive to the vehicle speed for subtracting an opposite voltage from said signal voltage equal to the portion of said signal voltage due to the tilting of said spin axis by said magnetic means to obtain a net signal voltage unaffected by said tilting, and means applying said net signal voltage to said motor means to move said frame to provide a true vertical reference unaffected by vertical rate of turn or change in speed.

4. Apparatus for providing a vertical reference on a moving vehicle comprising, a gyro mounted for universal movement in a gimbal system, a frame for supporting said gimbal system and adapted to provide a vertical reference, an erecting system for urging a spin axis of said gyro toward the vertical position, means for roll stabilizing said frame with respect to said gyro, means for precessnig said gyro in the direction of movement of said vehicle and in proportion to the speed thereof, means for pitch stabilizing said frame further comprising biasing means compensating for the departure of the gyro spin axis due to said precession whereby a true vertical reference is provided independent of said precession due to the speed of said vehicle.

5. In a gyro vertical for a moving vehicle, a rotor mounted within a gimbal frame for universal movement relative to said frame, pendulous means for erecting said gyro, precessing means for tilting the spin axis of said rotor forward in accordance with vehicle speed, means for stabilizing said frame to provide a vertical reference, said stabilizing means including motor means for moving said frame, pick-up coils mounted on said frame and adapted to produce a stabilizing signal responsive to a departure of said rotor spin axis from a neutral position with respect to said frame, and bias means responsive to the speed of the vehicle for producing a bias signal equal to the portion of said stabilizing signal caused by the action of said precessing means, and means coupling said signals to actuate said motor means with said bias signal connected in opposition to said stabilizing signal whereby said frame is stabilized by said motor means to provide a vertical reference independent of gyro tilting caused by the vehicle speed.

6. In a gyroscope adapted to be mounted in a moving vehicle, a rotor, a housing mounting said rotor, a stabilized frame, a gimbal system universally suspending said housing and mounted for rotation within said frame, a magnetic member affixed to said housing, an electromagnetic coil fixed with respect to said frame and disposed to exert a magnetic precessing torque of a predetermined direction on said magnetic member, said torque being unaffected by rotation of said member, and means for varying the energization of said coil in accordance to the speed of said vehicle whereby said magnetic member and thereby said rotor are tilted an amount proportional to the speed of said vehicle.

7. In a gyro vertical for movable vehicles in which the gyro rotor is variably inclined from the true vertical in the direction of vehicle movement to eliminate rotor errors due to both change of vehicle speed and turns thereof, an erection system comprising a first member mounted on said gyro, a second member mounted as a pendulum free to swing universally relative to said first member under the influence of gravity and accelerations acting thereon, one of said members including an eddy-current conductor and the other including magnetic means for producing a constant magnetic flux in said eddy-current conductor, torque producing means for displacing said second member about an axis transverse to the longitudinal axis of said vehicle to effect a precession of said gyro in accordance with the eddy-current drag between said members, and a device responsive to vehicle speed for actuating said torque producing means as a direct function of vehicle speed whereby said gyro is variably inclined in direct proportion to vehicle speed, means for indicating the position of said rotor relative to said vehicle, and means responsive to vehicle speed for biasing said indicating means in accordance with said vehicle speed to provide a true vertical position indication.

References Cited in the file of this patent

UNITED STATES PATENTS

| | | |
|---|---|---|
| 2,293,039 | Esval | Aug. 18, 1942 |
| 2,293,092 | Wittkuhns | Aug. 18, 1942 |
| 2,409,659 | Braddon | Oct. 22, 1946 |
| 2,417,066 | Douglas | Mar. 11, 1947 |
| 2,419,063 | Fischer | Apr. 15, 1947 |
| 2,501,885 | Barnes et al. | Mar. 28, 1950 |
| 2,504,604 | Tear | Apr. 18, 1950 |
| 2,519,459 | Hanna et al. | Aug. 22, 1950 |
| 2,630,017 | Slater | Mar. 3, 1953 |

FOREIGN PATENTS

| | | |
|---|---|---|
| 615,734 | Great Britain | Jan. 11, 1949 |